US008978602B2

(12) United States Patent
Williams et al.

(10) Patent No.: US 8,978,602 B2
(45) Date of Patent: Mar. 17, 2015

(54) SIX-STROKE ENGINE POWER DENSITY MATCHING SYSTEM AND METHOD (71) Applicant: Caterpillar Inc., Peoria, IL (US)

(72) Inventors: D. Ryan Williams, Edwards, IL (US); Scott B. Fiveland, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 147 days.

(21) Appl. No.: 13/711,776

(22) Filed: Dec. 12, 2012

(65) Prior Publication Data

US 2014/0158070 A1    Jun. 12, 2014

(51) Int. Cl.
*F02M 25/07* (2006.01)
*F02B 75/02* (2006.01)
*F02D 13/02* (2006.01)
*F02D 41/00* (2006.01)

(52) U.S. Cl.
CPC .......... *F02B 75/021* (2013.01); *F02D 13/0203* (2013.01); *F02D 13/0269* (2013.01); *F02D 13/0273* (2013.01); *F02D 41/0002* (2013.01); *F02D 41/005* (2013.01); *F02D 2041/001* (2013.01); *F02M 25/0707* (2013.01); *F02M 25/0709* (2013.01); *Y02T 10/142* (2013.01); *Y02T 10/18* (2013.01); *Y02T 10/42* (2013.01); *Y02T 10/47* (2013.01)
USPC ......................................... 123/64; 123/90.15

(58) Field of Classification Search
USPC ..................... 123/64, 90.15–90.18
See application file for complete search history.

(56) References Cited

U.S. PATENT DOCUMENTS

| 4,179,892 | A | 12/1979 | Heydrich |
| 4,736,715 | A | 4/1988 | Larsen |
| 5,224,460 | A | 7/1993 | Havstad et al. |
| 5,284,116 | A | 2/1994 | Richeson, Jr. |
| 5,564,275 | A | 10/1996 | Codan et al. |
| 6,209,324 | B1 | 4/2001 | Daudel et al. |
| 6,293,092 | B1 | 9/2001 | Ament et al. |
| 6,295,817 | B1 | 10/2001 | Abthoff et al. |
| 6,321,731 | B1 | 11/2001 | Russ et al. |
| 6,324,847 | B1 | 12/2001 | Pierpont |
| 6,332,446 | B1 | 12/2001 | Matsumoto et al. |
| 6,491,016 | B1 | 12/2002 | Buratti |
| 6,557,779 | B2 | 5/2003 | Perr et al. |
| 6,564,758 | B1 | 5/2003 | Enderle et al. |
| 6,619,241 | B2 | 9/2003 | Otterspeer et al. |
| 6,622,693 | B2 | 9/2003 | Arndt et al. |
| 6,705,543 | B2 | 3/2004 | Carroll, III et al. |

(Continued)

FOREIGN PATENT DOCUMENTS

| JP | 03-115743 | 5/1991 |
| WO | WO 2009/081227 A1 | 7/2009 |
| WO | WO 2010/075165 A1 | 7/2010 |

*Primary Examiner* — M. McMahon
(74) *Attorney, Agent, or Firm* — Leydig, Voit & Mayer, Ltd.

(57) ABSTRACT

An engine combustion cylinder is fluidly connectable to an intake system through an intake valve and to an exhaust system through an exhaust valve. A valve activation system is to activate the intake valve and the exhaust valve. The valve activation system is responsive to a controller providing command signals to the valve activation system such that, when the engine operates in a six-stroke combustion cycle, the intake valve is opened during a recompression stroke to allow a portion of the products from the first combustion stroke to exit the combustion cylinder and enter into the intake system. This may be done to match the power densities of the first and second power strokes of the piston.

20 Claims, 5 Drawing Sheets

(56) References Cited

U.S. PATENT DOCUMENTS

| | | | |
|---|---|---|---|
| 6,758,174 B1 | 7/2004 | Fuerhapter | |
| 6,772,742 B2 | 8/2004 | Lei et al. | |
| 6,807,956 B2 | 10/2004 | Gaessler et al. | |
| 6,941,746 B2 | 9/2005 | Tarabulski et al. | |
| 6,966,505 B2 | 11/2005 | Peterson, Jr. | |
| 7,031,821 B2 | 4/2006 | Lewis et al. | |
| 7,096,848 B2 | 8/2006 | Ono et al. | |
| 7,143,725 B1 | 12/2006 | Hu | |
| 7,181,902 B2 | 2/2007 | Naik | |
| 7,213,565 B2 | 5/2007 | Grünaug et al. | |
| 7,264,785 B2 | 9/2007 | Blakeman et al. | |
| 7,287,378 B2 | 10/2007 | Chen et al. | |
| 7,418,928 B2 | 9/2008 | Fiveland | |
| 7,422,000 B2 | 9/2008 | Kesse et al. | |
| 7,426,916 B2 | 9/2008 | Reed et al. | |
| 7,500,475 B2 | 3/2009 | Raymond et al. | |
| 7,513,239 B2 | 4/2009 | Blessing et al. | |
| 7,556,017 B2 | 7/2009 | Gibson | |
| 7,597,865 B2 | 10/2009 | Mori et al. | |
| 7,673,590 B2 | 3/2010 | Reed et al. | |
| 7,685,990 B2 | 3/2010 | Dingle | |
| 7,726,268 B2 | 6/2010 | Kelem et al. | |
| 7,763,222 B2 | 7/2010 | Miyairi et al. | |
| 7,867,598 B2 | 1/2011 | Miyairi et al. | |
| 7,891,345 B2 | 2/2011 | Pierpont | |
| 8,051,659 B2 | 11/2011 | Yamashita et al. | |
| 8,096,279 B2 | 1/2012 | Kuzuyama | |
| 8,136,504 B2 | 3/2012 | Winstead | |
| 8,141,352 B2 | 3/2012 | Tsujimoto et al. | |
| 2002/0050253 A1* | 5/2002 | Schmitz | 123/64 |
| 2002/0108591 A1* | 8/2002 | Lou | 123/90.12 |
| 2003/0154964 A1* | 8/2003 | Gaessler et al. | 123/568.14 |
| 2008/0098969 A1* | 5/2008 | Reed et al. | 123/64 |
| 2009/0145382 A1 | 6/2009 | Kawai | |
| 2010/0050963 A1 | 3/2010 | Ooyama | |
| 2010/0212300 A1 | 8/2010 | Fiveland et al. | |
| 2010/0269775 A1 | 10/2010 | Chandes et al. | |
| 2010/0269783 A1* | 10/2010 | Hergart et al. | 123/295 |
| 2011/0162349 A1 | 7/2011 | Cheng et al. | |
| 2011/0197852 A1 | 8/2011 | Meyman | |

* cited by examiner

SIX-STROKE ENGINE POWER DENSITY MATCHING SYSTEM AND METHOD

TECHNICAL FIELD

This patent disclosure relates generally to internal combustion engines and, more particularly, to internal combustion engines that are configured to operate on a six-stroke internal combustion cycle.

BACKGROUND

Internal combustion engines operating on a six-stroke cycle are generally known in the art. In a six-stroke cycle, a piston reciprocally disposed in a cylinder moves through an intake stroke from a top dead center (TDC) position towards a bottom dead center (BDC) position to admit air or a mixture of air with fuel and/or exhaust gas into the cylinder through one or more intake valves. The intake valve(s) selectively fluidly connect the cylinder with an air source, and are in an open position during the intake stroke to allow the cylinder to fill with air or a mixture thereof.

When the cylinder has sufficiently filled, the intake valve(s) close(s) to fluidly trap the air or air mixture within the cylinder. During a compression stroke, the piston moves back towards the TDC position to compress the air or the air mixture trapped in the cylinder. During this process, an initial or additional fuel charge may be introduced to the cylinder by an injector. The compressed air/fuel mixture in the cylinder then ignites, thus increasing fluid pressure within the cylinder. The increased pressure pushes the piston towards the BDC position in what is commonly referred to as a combustion or power stroke.

In accordance with the six-stroke cycle, the piston performs a second compression stroke in which it recompresses the combustion products remaining in the cylinder after the first combustion or power stroke. During this recompression, any exhaust valves associated with the cylinder remain generally closed to assist cylinder recompression. Optionally, a second fuel charge and/or additional air may be introduced into the cylinder during recompression to assist igniting the residual combustion products and produce a second power stroke. Following the second power stroke, the cylinder undergoes an exhaust stroke during which the piston moves towards the TDC position and one or more exhaust valves are opened to help evacuate combustion by-products from the cylinder. One example of an internal combustion engine configured to operate on a six-stroke cycle is disclosed in U.S. Pat. No. 7,418,928.

The re-compression and re-combustion of combustion products from the first power stroke of a cylinder in six-stroke engines, however, often results in increased emissions, and especially emissions that result when the fluids within the cylinder are at a high temperature. For example, the production of nitrous oxides (NOx) increases with increasing cylinder temperatures. The production of such NOx and other emissions is disfavored, especially since NOx emissions are regulated for diesel engines.

SUMMARY

In one aspect, the disclosure describes an internal combustion engine system operating on a six-stroke cycle that includes a cylinder and a piston reciprocally disposed in the cylinder to move between a top dead center position and a bottom dead center position. An intake system communicates with the cylinder to introduce charge gas into the cylinder through an intake valve. An exhaust system communicates with the cylinder to direct exhaust gasses from the cylinder through an exhaust valve. A fuel injector is disposed to inject fuel into the cylinder. The engine operates on a combustion cycle that includes an intake stroke, during which air is admitted into the combustion cylinder, a compression stroke, during which the air in the combustion cylinder is compressed and fuel is added, a first power stroke, a second compression stroke, during which products from the first combustion stroke are compressed in the combustion cylinder, a second power stroke, and an exhaust stroke. A controller is configured and operable to determine a desired power density for a power stroke of the piston in the cylinder based on one or more operating parameters of the internal combustion engine. The controller controls opening of the intake valve and operation of the fuel injector to provide a desired fuel and charge gas mixture for producing the desired power density during a first power stroke of the piston in the cylinder. The controller controls timing of at least one of the intake and exhaust valves during the second compression stroke of the piston in the cylinder to produce the desired power density during the second power stroke.

In another aspect, the disclosure describes an internal combustion engine having a combustion cylinder, which operates on a combustion cycle that includes an intake stroke, during which air is admitted into the combustion cylinder, a compression stroke, during which the air in the combustion cylinder is compressed and fuel is added, a first power stroke, a second compression stroke, during which products from the first combustion stroke are compressed in the combustion cylinder, a second power stroke, and an exhaust stroke. The engine includes an intake system in fluid communication with the combustion cylinder and an exhaust system in fluid communication with the combustion cylinder. An intake valve is disposed to selectively fluidly connect the combustion cylinder with the intake system. An exhaust valve is disposed to selectively fluidly connect the combustion cylinder with the exhaust system. A variable valve activation system is configured to activate the intake valve and the exhaust valve. A fuel injector is disposed to inject a fuel into the combustion cylinder. A controller is configured to determine a desired power density for a power stroke of the piston in the cylinder based on one or more operating parameters of the internal combustion engine. The controller provides command signals to the variable valve activation system and the fuel injector such that a desired fuel and charge gas mixture is introduced into the combustion cylinder for producing the desired power density during the first power stroke and at least one of the intake valve and the exhaust valve are activated during the second compression stroke according to a timing that produces the desired power density during the second power stroke.

In yet another aspect, the disclosure describes a method of operating an internal combustion engine having one or more combustion chambers operating a six-stroke cycle, the method includes monitoring one or more operating parameters related to the internal combustion engine. A desired power density for a power stroke of a piston in a combustion chamber of the internal combustion engine is determined based on the one or more operating parameters. A desired fuel and charge gas mixture for producing the desired powered density for a first power stroke of the piston is determined. The desired fuel and charge gas mixture is introduced into the combustion chamber. The fuel and charge gas mixture is combusted in the combustion chamber of the internal combustion engine in the first power stroke. The first combustion products in the combustion chamber are compressed in a compression stroke. A desired valve timing for the compression stroke is determined for an intake valve and an exhaust valve associated with the combustion chamber to produce the desired power density for a second power stroke of the piston. At least one of the intake valve and the exhaust valve is activated during the compression stroke according to the desired valve timing to release a portion of the first combustion products from the combustion chamber through one or both of the intake valve and the exhaust valve during the compression stroke.

DETAILED DESCRIPTION

This disclosure generally relates to internal combustion engines and, more particularly, to engines operating with a six stroke cycle. More specifically, certain disclosed engine embodiments are configured to optimize engine operation and reduce emissions by employing a method and system for matching the power density of the two power strokes in the six stroke cycle. In general, internal combustion engines burn a hydrocarbon-based fuel or another combustible fuel source to convert the potential or chemical energy therein to mechanical power that can be utilized for other work. In one embodiment, the disclosed engine may be a compression ignition engine, such as a diesel engine, in which a mixture of air and fuel are compressed in a cylinder to raise their pressure and temperature to a point at which auto-ignition or spontaneous ignition occurs. Such engines typically lack a sparkplug that is typically associated with gasoline burning engines. However, in alternative embodiments, the utilization of different fuels such as gasoline and different ignition methods, for example, use of diesel as a pilot fuel to ignite gasoline or natural gas, are contemplated and fall within the scope of the disclosure.

Figure 1:
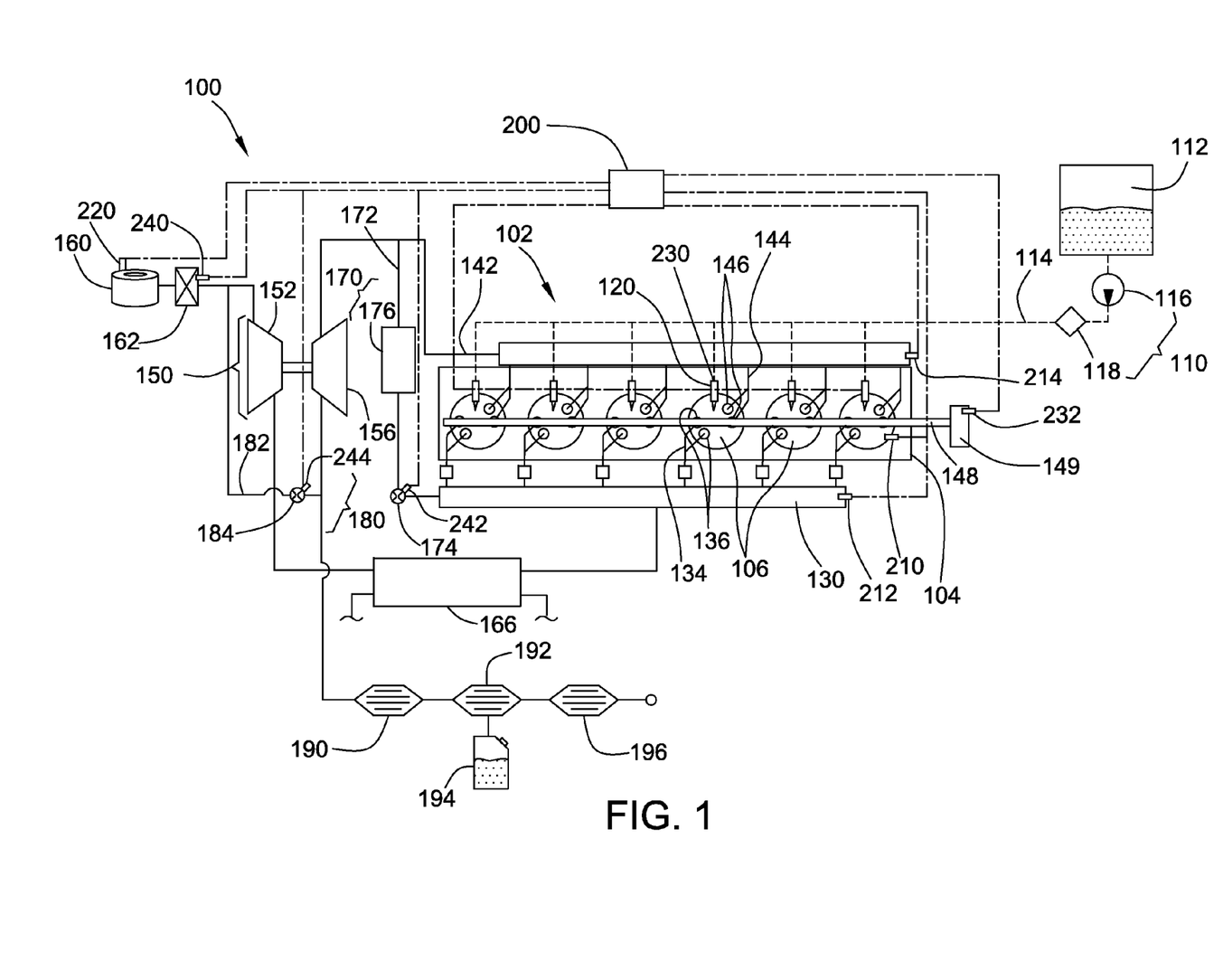
FIG. 1 is a block diagram of an engine system having an internal combustion engine adapted for operation in accordance with a six-stroke combustion cycle and associated systems and components for performing the combustion process.

Now referring to FIG. 1, wherein like reference numbers refer to like elements, there is illustrated a block diagram representing an internal combustion engine system 100. The engine system 100 includes an internal combustion engine 102 and, in particular, a diesel engine that combusts a mixture of air and diesel fuel. The illustrated internal combustion engine 102 includes an engine block 104 in which a plurality of combustion chambers 106 are disposed. Although six combustion chambers 106 are shown in an inline configuration, in other embodiments fewer or more combustion chambers may be included or another configuration such as a V-configuration may be employed. The engine system 100 can be utilized in any suitable application including mobile applications such as motor vehicles, work machines, locomotives or marine engines, and stationary applications such as electrical power generators, pumps and others.

To supply the fuel that the engine 102 burns during the combustion process, a fuel system 110 is operatively associated with the engine system 100. The fuel system 110 includes a fuel reservoir 112 that can accommodate a hydrocarbon-based fuel such as liquid diesel fuel. Although only one fuel reservoir is depicted in the illustrated embodiment, it will be appreciated that in other embodiments additional reservoirs may be included that accommodate the same or different types of fuels that may also be burned during the combustion process. In the illustrated embodiment, a fuel line 114 directs fuel from the fuel reservoir 112 to the engine. To pressurize the fuel and force it through the fuel line 114, a fuel pump 116 can be disposed in the fuel line. An optional fuel conditioner 118 may also be disposed in the fuel line 114 to filter the fuel or otherwise condition the fuel by, for example, introducing additives to the fuel, heating the fuel, removing water and the like.

To introduce the fuel to the combustion chambers 106, the fuel line 114 may be in fluid communication with one or more fuel injectors 120 that are associated with the combustion chambers. In the illustrated embodiment, one fuel injector 120 is associated with each combustion chamber but in other embodiments different numbers of injectors might be included. Additionally, while the illustrated embodiment depicts the fuel line 114 terminating at the fuel injectors, the fuel line may establish a fuel loop that continuously circulates fuel through the plurality of injectors and, optionally, delivers unused fuel back to the fuel reservoir 112. Alternatively, or in addition, the fuel line 114 may include a high-pressure fuel collector (not shown), which supplies the fuel injectors with pressurized fuel during operation. The fuel injectors 120 can be electrically actuated devices that selectively introduce a measured or predetermined quantity of fuel to each combustion chamber 106. In other embodiments, introduction methods other than or in addition to fuel injectors, such as a carburetor or the like, can be utilized.

To supply the air to the combustion chambers 106, a hollow runner or intake manifold 130 can be formed in or attached to the engine block 104 such that it extends over or proximate to each of the combustion chambers. The intake manifold 130 can communicate with an intake line 132 that directs air to the internal combustion engine 102. Fluid communication between the intake manifold 130 and the combustion chambers 106 can be established by a plurality of intake runners 134 extending from the intake manifold. One or more intake valves 136 can be associated with each combustion chamber 106 and can open and close to selectively introduce the intake air from the intake manifold 130 to the combustion chamber. While the illustrated embodiment depicts the intake valves at the top of the combustion chamber 106, in other embodiments the intake valves may be placed at other locations such as through a sidewall of the combustion chamber. To direct the exhaust gasses produced by combustion of the air/fuel mixture out of the combustion chambers 106, an exhaust manifold 140 communicating with an exhaust line 142 can also be disposed in or proximate to the engine block 104. The exhaust manifold 140 can communicate with the combustion chambers 106 by exhaust runners 144 extending from the exhaust manifold 140. The exhaust manifold 140 can receive exhaust gasses by selective opening and closing of one or more exhaust valves 146 associated with each chamber.

To actuate the intake valves 136 and the exhaust valves 146, the illustrated embodiment depicts an overhead camshaft 148 that is disposed over the engine block 104 and operatively engages the valves. As will be familiar to those of skill in the art, the intake and exhaust valves 136, 148 may be actuated by pushrods 145 and the camshaft 148 can include a plurality of eccentric lobes disposed along its length that, as the camshaft rotates, engage the pushrods and thereby cause the intake and exhaust valves 136, 146 to displace or move up and down in an alternating manner with respect to the combustion chambers 106. Movement of the valves can seal and unseal ports leading into the combustion chamber. The placement or configuration of the lobes along the camshaft 148 may be used to control or determine the gas flow through the internal combustion engine 102. As is known in the art, other methods exist for implementing valve timing such as actuators acting on the individual valve stems and the like.

A variable valve timing method can be employed that adjusts the timing and duration of actuating the intake and exhaust valves to adjust the combustion process. In general, the variable valve timing for the engine 102 can be accomplished in any known way. In one embodiment, contoured lobes formed on the camshaft 148 are manipulated to alter the timing and duration of valve events by moving the camshaft along its axis to expose the valve activators to changing lobe contours. To implement these adjustments in the illustrated embodiment, the camshaft 148 can be associated with a camshaft actuator 149.

Figures 2, 3, 4:
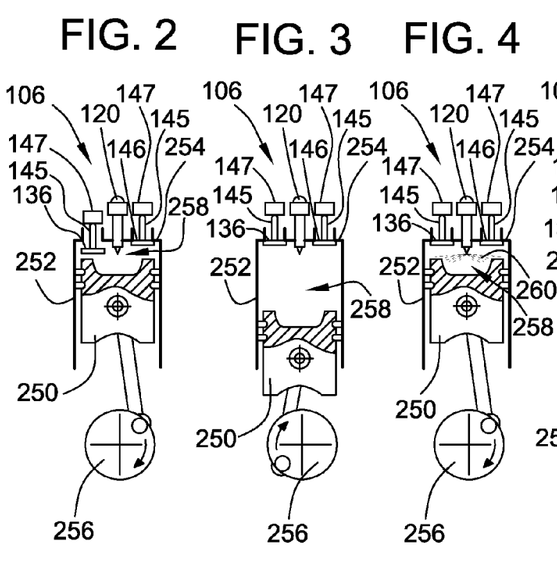
FIGS. 2-8 are cross-sectional views representing an engine cylinder and a piston movably disposed therein at various points during a six-stroke combustion cycle.

According to another embodiment, a variable valve activation system can be provided that includes devices and actuators that act on the valve pushrods 145 to keep the respective valve open for a prolonged period or close the valve in an early fashion. One example of a mechanism used for varying valve timing includes actuators or other mechanisms operating to selectively push onto a push rod 145 to maintain a valve open for a predetermined time regardless of the normal activation of the valve through a regular engine valve activation system such as a cam-follower arrangement. In the illustrated embodiment, a plurality of actuators 147, each associated with an intake or exhaust valve 136, 146, is shown in FIG. 2. The actuators 147 may be electrically, hydraulically or otherwise actuated in response to control signals provided to the actuators. Although actuators 147 are shown associated with the pushrods 145, any other device that is capable of acting on the pushrods 145 or otherwise affecting valve position to hold the respective intake valve 136 or exhaust valve 146 open and thereby vary the valve timing is contemplated.

To assist in directing the intake air to and exhaust gasses from the internal combustion engine 102, the engine system 100 can include a turbocharger 150. The turbocharger 150 includes a compressor 152 disposed in the intake line 132 that compresses intake air drawn from the atmosphere and directs the compressed air to the intake manifold 130. Although a single turbocharger 150 is shown, more than one such device connected in series and/or in parallel with another can be used. To power the compressor 152, a turbine 156 can be disposed in the exhaust line 142 and can receive pressurized exhaust gasses from the exhaust manifold 140. The pressurized exhaust gasses directed through the turbine 156 can rotate a turbine wheel having a series of blades thereon, which powers a shaft that causes a compressor wheel to rotate within the compressor housing.

To filter debris from intake air drawn from the atmosphere, an air filter 160 can be disposed upstream of the compressor 152. In some embodiments, the engine system 100 may be open-throttled wherein the compressor 152 draws air directly from the atmosphere with no intervening controls or adjustability, while in other embodiments, to assist in controlling or governing the amount of air drawn into the engine system 100, an adjustable governor or intake throttle 162 can be disposed in the intake line 132 between the air filter 160 and the compressor 152. Because the intake air may become heated during compression, an intercooler 166 such as an air-to-air heat exchanger can be disposed in the intake line 132 between the compressor 152 and the intake manifold 130 to cool the compressed air.

To reduce emissions and assist adjusted control over the combustion process, the engine system 100 can mix the intake air with a portion of the exhaust gasses drawn from the exhaust system of the engine through a system or process called exhaust gas recirculation ("EGR"). The EGR system forms an intake air/exhaust gas mixture that is introduced to the combustion chambers. In one aspect, addition of exhaust gasses to the intake air displaces the relative amount of oxygen in the combustion chamber during combustion that results in a lower combustion temperature and reduces the generation of nitrogen oxides. Two exemplary EGR systems are shown associated with the engine system 100 in FIG. 1, but it should be appreciated that these illustrations are exemplary and that either one, both, or neither can be used on the engine. It is contemplated that selection of an EGR system of a particular type may depend on the particular requirements of each engine application.

In the first embodiment, a high-pressure EGR system 170 operates to direct high-pressure exhaust gasses to the intake manifold 130. The high-pressure EGR system 170 includes a high-pressure EGR line 172 that communicates with the exhaust line 142 downstream of the exhaust manifold 140 and upstream of the turbine 156 to receive the high-pressure exhaust gasses being expelled from the combustion chambers 106. The system is thus referred to as a high-pressure EGR system 170 because the exhaust gasses received have yet to depressurize through the turbine 156. The high-pressure EGR line 172 is also in fluid communication with the intake manifold 130. To control the amount or quantity of the exhaust gasses combined with the intake air, the high-pressure EGR system 170 can include an adjustable EGR valve 174 disposed along the high-pressure EGR line 172. Hence, the ratio of exhaust gasses mixed with intake air can be varied during operation by adjustment of the adjustable EGR valve 174. Because the exhaust gasses may be at a sufficiently high temperature that may affect the combustion process, the high-pressure EGR system can also include an EGR cooler 176 disposed along the high-pressure EGR line 172 to cool the exhaust gasses.

In the second embodiment, a low-pressure EGR system 180 directs low-pressure exhaust gasses to the intake line 132 before it reaches the intake manifold 130. The low-pressure EGR system 180 includes a low-pressure EGR line 182 that communicates with the exhaust line 142 downstream of the turbine 156 so that it receives low-pressure exhaust gasses that have depressurized through the turbine, and delivers the exhaust gas upstream of the compressor 152 so it can mix and be compressed with the incoming air. The system is thus referred to as a low-pressure EGR system because it operates using depressurized exhaust gasses. To control the quantity of exhaust gasses re-circulated, the low-pressure EGR line 182 can also include an adjustable EGR valve 184.

To further reduce emissions generated by the combustion process, the engine system 100 can include one or more after-treatment devices disposed along the exhaust line 142 that treat the exhaust gasses before they are discharged to the atmosphere. One example of an after-treatment device is a diesel particulate filter ("DPF") 190 that can trap or capture particulate matter in the exhaust gasses. Once the DPF has reached its capacity of captured particulate matter, it must be either cleaned or regenerated. Regeneration may be done either passively or actively. Passive regeneration utilizes heat inherently produced by the engine to burn or incinerate the captured particulate matter. Active regeneration generally requires higher temperature and employs an added heat source such as a burner to heat the DPF. Another after-treatment device that may be included with the engine system is a selective catalytic reduction ("SCR") system 192. In an SCR system 192, the exhaust gasses are combined with a reductant agent such as ammonia or urea and are directed through a catalyst that chemically converts or reduces the nitrogen oxides in the exhaust gasses to nitrogen and water. To provide the reductant agent, a separate storage tank 194 may be associated with the SCR system and in fluid communication with the SCR catalyst. A diesel oxidation catalyst 196 is a similar after-treatment device made from metals such as palladium and platinum that can convert hydrocarbons and carbon monoxide in the exhaust gasses to carbon dioxide. Other types of catalytic converters, three way converters, mufflers and the like can also be included as possible after-treatment devices.

To coordinate and control the various systems and components associated with the engine system 100, the system can include an electronic or computerized control unit, module or controller 200. The controller 200 is adapted to monitor various operating parameters and to responsively regulate various variables and functions affecting engine operation. The controller 200 can include a microprocessor, an application specific integrated circuit ("ASIC"), or other appropriate circuitry and can have memory or other data storage capabilities. The controller can include functions, steps, routines, data tables, data maps, charts and the like saved in and executable from read only memory to control the engine system. Although in FIGS. 1 and 2, the controller 200 is illustrated as a single, discrete unit, but in other embodiments, the controller and its functions may be distributed among a plurality of distinct and separate components. To receive operating parameters and send control commands or instructions, the controller can be operatively associated with and can communicate with various sensors and controls on the engine system 100. Communication between the controller and the sensors can be established by sending and receiving digital or analog signals across electronic communication lines or communication busses. The various communication and command channels are indicated in dashed lines for illustration purposes.

For example, to monitor the pressure and/or temperature in the combustion chambers 106, the controller 200 may communicate with chamber sensors 210 such as a transducer or the like, one of which may be associated with each combustion chamber 106 in the engine block 104. The chamber sensors 210 can monitor the combustion chamber conditions directly or indirectly. For example, by measuring the backpressure exerted against the intake or exhaust valves, or other components that directly or indirectly communicate with the combustion cylinder such as glow plugs, during combustion, the chamber sensors 210 and the controller 200 can indirectly measure the pressure in the combustion chamber 106. The controller can also communicate with an intake manifold sensor 212 disposed in the intake manifold 130 and that can sense or measure the conditions therein. To monitor the conditions such as pressure and/or temperature in the exhaust manifold 140, the controller 200 can similarly communicate with an exhaust manifold sensor 214 disposed in the exhaust manifold 140. From the temperature of the exhaust gasses in the exhaust manifold 140, the controller 200 may be able to infer the temperature at which combustion in the combustion chambers 106 is occurring.

To measure the flow rate, pressure and/or temperature of the air entering the engine, the controller 200 can communicate with an intake air sensor 220. The intake air sensor 220 may be associated with, as shown, the intake air filter 160 or another intake system component such as the intake manifold. The intake air sensor 220 may also determine or sense the barometric pressure or other environmental conditions in which the engine system is operating.

To further control the combustion process, the controller 200 can communicate with injector controls 230 that can control the fuel injectors 120 operatively associated with the combustion chambers 106. The injector controls 240 can selectively activate or deactivate the fuel injectors 120 to determine the timing of introduction and the quantity of fuel introduced by each fuel injector. To further control the timing of the combustion operation, the controller 200 can also communicate with a camshaft control 232 that is operatively associated with the camshaft 148 and/or camshaft actuator 149 to control the variable valve timing, when such a capability is used.

To further control the timing of the combustion operation by adjusting the valve timing, the controller 200 in the illustrated embodiment can also communicate with a camshaft control 232 that is operatively associated with the camshaft 148 and/or camshaft actuator 149. The controller 200 can also communicate and provide a timing phase command to the actuators 147 associated with the intake and exhaust valves, if present, to dynamically adjust the valve timing during operation. Alternatively, the controller 200 may communicate with and control any other device used to monitor and/or control valve timing.

In embodiments having an intake throttle 155, the controller 200 can communicate with a throttle control associated with the throttle and that can control the amount of air drawn into the engine system 100. Alternatively, the amount of air used by the engine may be controlled by variably controlling the intake valves in accordance with a Miller cycle, which includes maintaining intake valves open for a period during the compression stroke and/or closing intake valves early during an intake stroke to thus reduce the amount of air compressed in the cylinder during operation. A Miller thermodynamic cycle is a term that generally refers to an engine cycle in which less air is used in the engine cylinders than during a typical Otto cycle. For example, an engine intake valve may be closed before the intake stroke is completed, which is a process commonly referred to as an early intake closing cycle ("EIC"), or may be left open through the first part of the compression stroke, which is a process commonly referred to as a late intake closing cycle ("LIC"). In this way, cylinders can operate having a variable displacement in terms of the air that is available for combustion. Thus, at low engine speeds and loads, an efficiency advantage may be gained. Either of the EIC or LIC cycles can be beneficial in selectively reducing the air that is available for combustion, which in turn provides better control over the air/fuel ratio of the engine and engine emissions. The controller 200 can also be operatively associated with either or both of the high-pressure EGR system 170 and the low-pressure EGR system 180. For example, the controller 200 is communicatively linked to a high-pressure EGR control 242 associated with the adjustable EGR valve 174 disposed in the high-pressure EGR line 182. Similarly, the controller 200 can also be communicatively linked to a low-pressure EGR control 244 associated with the adjustable EGR valve 184 in the low-pressure EGR line 182. The controller 200 can thereby adjust the amount of exhaust gasses and the ratio of intake air/exhaust gasses introduced to the combustion process.

The engine system 100 can operate in accordance with a six-stroke combustion cycle in which the reciprocal piston disposed in the combustion chamber makes six or more strokes between the top dead center ("TDC") position and bottom dead center ("BDC") position during each cycle. A representative series of six strokes and the accompanying operations of the engine components associated with the combustion chamber 106 are illustrated in FIGS. 2-8 and the valve lift and related cylinder pressure are charted with respect to crank angle in FIGS. 9 and 10. Additional strokes, for example, 8-stroke or 10-stroke operation and the like, which would include one or more successive recompressions, are not discussed in detail herein as they would be similar to the recompression and re-combustion that is discussed, but are contemplated to be within the scope of the disclosure.

The actual strokes are performed by a reciprocal piston 250 that is slidably disposed in an elongated cylinder 252 bored into the engine block. One end of the cylinder 250 is closed off by a flame deck surface 254 so that the combustion chamber 106 defines an enclosed space between the piston 250, the flame deck surface and the inner wall of the cylinder. The reciprocal piston 250 moves between the TDC position where the piston is closest to the flame deck surface 254 and the BDC position where the piston is furthest from the flame deck surface. The motion of the piston 250 with respect to the flame deck surface 254 thereby defines a variable volume 258 that expands and contracts.

Referring to FIG. 2, the six-stroke cycle starts with an intake stroke during which the piston 250 moves from the TDC position to the BDC position causing the variable volume 258 to expand. During this stroke, the intake valve 136 is opened so that air or an air/fuel mixture may be drawn into the combustion chamber 106, as represented by the positive bell-shaped intake curve 270 indicating intake valve lift in FIG. 9. The duration of the intake valve opening may optionally be adjusted to control the amount of air provided to the cylinder, as previously discussed. Referring to FIG. 3, once the piston 250 reaches the BDC position, the intake valve 136 closes and the piston can perform a first compression stroke moving back toward the TDC position and compressing the variable volume 258 that has been filled with air during the intake stroke. As indicated by the upward slope of the first compression curve 280 in FIG. 11, this motion increases pressure and temperature in the combustion chamber. In diesel engines, the compression ratio can be on the order of 15:1, although other compression ratios are common.

As illustrated in FIG. 4, in those embodiments in which air or an air/exhaust gas mixture, sometimes referred to as charge gas, is initially drawn into the combustion chamber 106, the fuel injector 120 can introduce a first fuel charge 260 into the variable volume 258 to create an air/fuel mixture as the piston 250 approaches the TDC position. The quantity of the first fuel charge 260 can be such that the resulting air/fuel mixture is lean, meaning there is an excess amount of oxygen to the quantity of fuel intended to be combusted. At an instance when the piston 250 is at or close to the TDC position and the pressure and temperature are at or near a first maximum pressure, as indicated by point 282 in FIG. 10, the air/fuel mixture may ignite. In embodiments where the fuel is less reactive, such as in gasoline burning engines, ignition may be induced by a sparkplug, by ignition of a pilot fuel or the like.

Figures 5, 6:
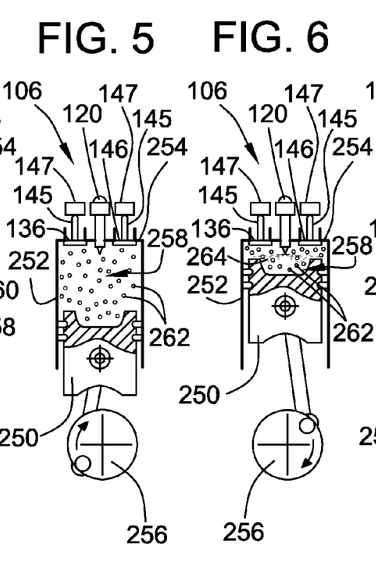

During a first power stroke, the combusting air/fuel mixture expands forcing the piston 250 back to the BDC position as indicated in FIGS. 4 to 5. The piston 250 can be linked or connected to a crankshaft 256 so that its linear motion is converted to rotational motion that can be used to power an application or machine. The expansion of the variable volume 258 during the first power stroke also reduces the pressure in the combustion chamber 106 as indicated by the downward sloping first expansion curve 284 in FIG. 10. At this stage, the variable volume contains the resulting combustion products 262 that may include unburned fuel, soot, ash and excess oxygen from the intake air, which remains unburned, especially if the first air/fuel mixture in the cylinder was selected to be leaner than stoichiometric.

According to some embodiments, the quantity of the fuel charge 260 as well as the amount and composition of the air or air/exhaust gas mixture that makes up the charge gas that is introduced into the combustion chamber 106 for the first power stroke can be determined based on a desired power density for the power strokes of the engine cycle. The power density of the power stroke can be determined as the power produced per swept volume of the cylinder 252 by the piston 250 with the power produced being determined as the force applied on the piston 252 times the speed at which the piston 252 moves. The desired power density can be determined by the controller 200 based on one or more operating parameters of the engine such as, for example, engine speed and load.

Referring to FIG. 6, in the six-stroke cycle, the piston 250 can perform another compression stroke in which it compresses the combustion products 262 in the variable volume 258 by moving back to the TDC position. During the second compression stroke, both the intake valve 136 and exhaust valve 146 are typically closed so that pressure increases in the variable volume as indicated by the second compression curve 286 in FIG. 10. In the embodiment of FIG. 1, the exhaust valve 146 may be briefly opened to discharge some of the contents in a process referred to as blowdown, as indicated by the small blowdown curve 272 in FIG. 9, into the exhaust manifold 140 of the engine.

Additionally, to further reduce emissions and to further adjust the combustion process, the intake valve 136 may be briefly opened in addition to or instead of the exhaust valve 146, as the piston performs the second compression stroke as indicated by the small intake blib curve 273. In other words, as the piston is recompressing the byproducts of the first power stroke that are present in the cylinder, the pressure of those byproducts will increase beyond the fluid pressure in the intake and exhaust manifolds of the engine. Under such conditions, opening the intake valve 136 will cause blowdown exhaust gas to exit the cylinder and pass directly into the intake manifold of the engine.

Figure 9:
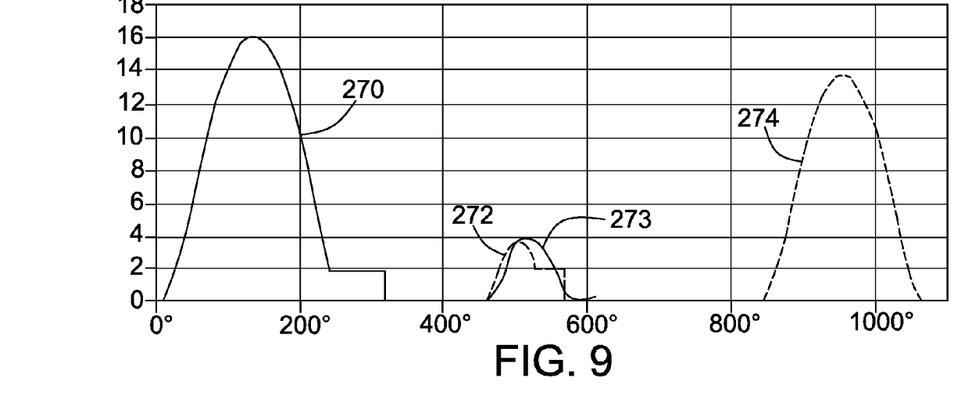
FIG. 9 is a chart representing the lift of the intake valve(s) and exhaust valve(s) along the y-axis in millimeters (mm) as measured against crankshaft angle in degrees along the x-axis for a six-stroke combustion cycle.
Figure 10:
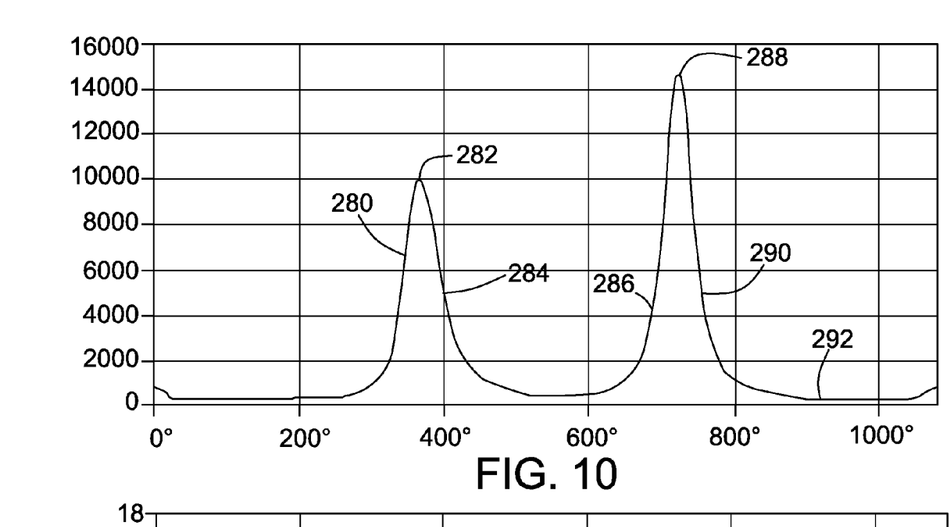
FIG. 10 is a chart illustrating a comparison of the internal cylinder pressure in kilopascals (kPa) as measured against crankshaft angle in degrees along the x-axis for a six-stroke combustion cycle.

When the piston 250 reaches or is proximate to the TDC position shown in FIG. 5, the fuel injector 120 can introduce a second fuel charge 264 into the combustion chamber 106 that can intermix with the combustion products 262 from the previous combustion event. Referring to FIG. 9, at this instance, the pressure in the compressed variable volume 258 will be at a second maximum pressure 288. The second maximum pressure 288 may be greater than the first maximum pressure 282 or may be otherwise controlled to be about the same or lower than the first maximum pressure.

Figure 11:
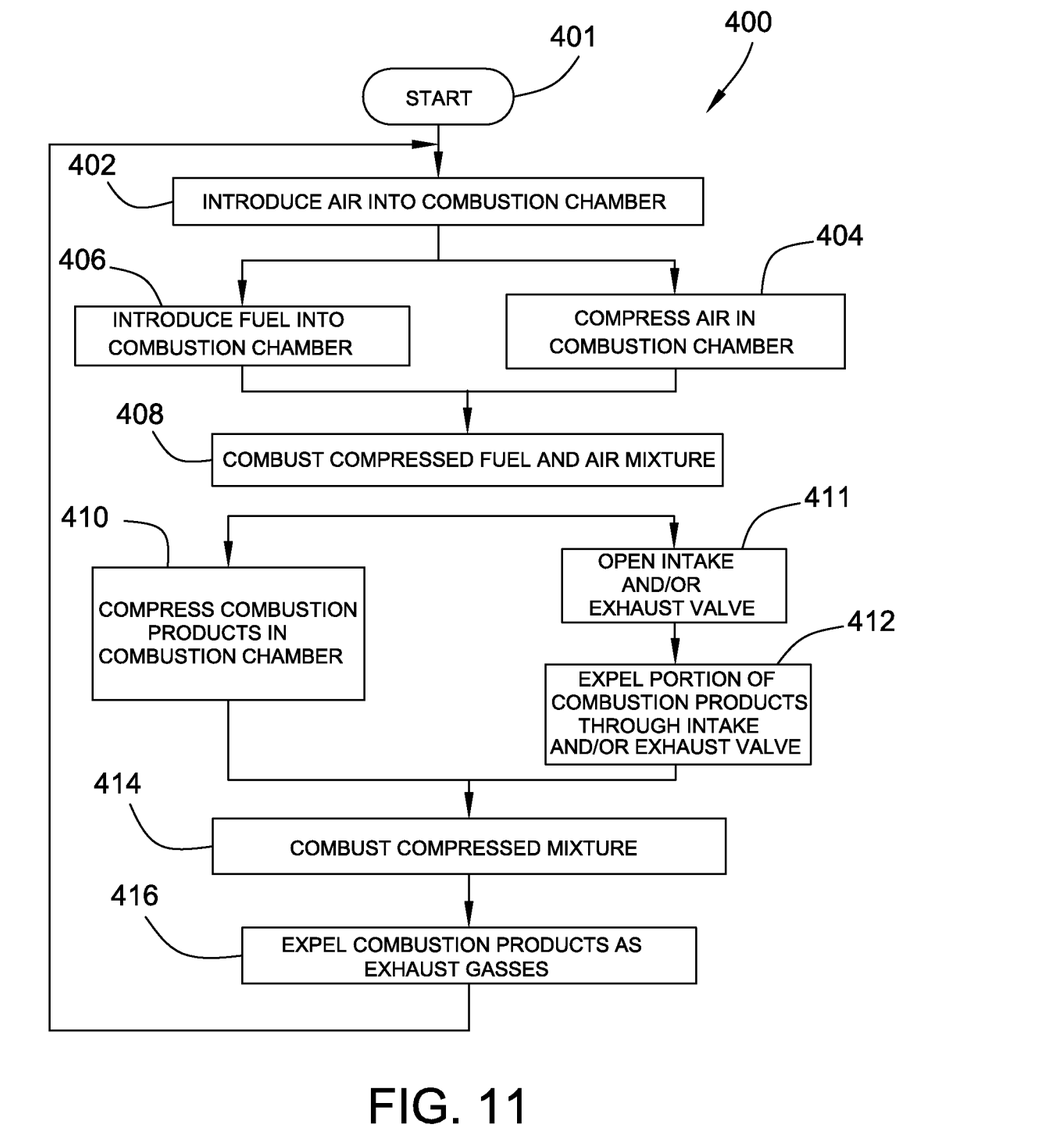
FIG. 11 is a flowchart for a method of operating a six-stroke combustion cycle engine in accordance with the disclosure.

When the piston 250 reaches the TDC position shown in FIG. 6, by which time the intake and exhaust valves 136 and 146 have closed, the fuel injector 120 can introduce a second fuel charge 264 into the combustion chamber 106 that can intermix with the combustion products 262 from the previous combustion event that remain in the cylinder. Referring to FIG. 11, at this instance, the pressure in the compressed variable volume 258 will be at a second maximum pressure 288. The second maximum pressure 288 may be greater than the first maximum pressure 282 or may be otherwise controlled to be about the same or lower than the first pressure. For example, to reduce the second maximum pressure 288, the engine may be controlled to remove more blowdown exhaust gas and/or reduce the amount of fuel provided to the cylinder in the second fuel charge 264.

Figure 7:
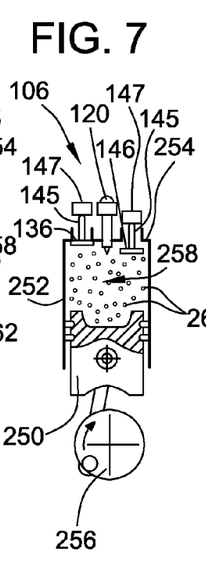

The quantity of the second fuel charge 264 provided to the cylinder, in conjunction with oxygen that may remain within the cylinder, can be selected such that stoichiometric or near stoichiometric conditions for combustion are provided within the combustion chamber 106. At stoichiometric conditions, the ratio of fuel to air is such that substantially the entire second fuel charge will react with all the remaining oxygen in the combustion products 262. When the piston 250 is at or near the TDC position and the combustion chamber 106 reaches the second maximum pressure 288, the second fuel charge 264 and the previous combustion products 262 may spontaneously ignite. Referring to FIGS. 6 to 7, the second ignition and resulting second combustion expands the contents of the variable volume 258 forcing the piston toward the BDC position resulting in a second power stroke driving the crankshaft 256. The second power stroke also reduces the pressure in the cylinder 252 as indicated by the downward sloping second expansion curve 290 in FIG. 10.

According to some embodiments, the timing of opening and closing of the intake valve and/or exhaust valve 136, 146 can be varied during the second compression stroke in order to help substantially match the power density of the second power stroke with the power density of the first power stroke. For example, this can be accomplished by using a late intake closing Miller technique with the intake valve 136 in order to control the amount of exhaust gas remaining in the combustion chamber 106 for the second power stroke. The intake valve 136 can be held open through the first part of the second compression stroke using an associated valve actuator 147 (see, e.g., FIG. 2) or any other suitable variable valve activation system. Moreover, the holding open of the intake valve 136 based on the Miller technique can be done in addition to or in conjunction with the intake blib 273 discussed above and shown in FIG. 9. The process of matching the power densities of the first and second power strokes can also include varying the opening and closing of the exhaust valve 146 during the second compression stroke. As with varying the activation of the intake valve 136, varying the opening and closing of the exhaust valve 146 can be used to control the amount of exhaust gas remaining in the combustion chamber 106 for the second power stroke and can be accomplished, for example, using the associated valve actuator 147 or any other suitable variable valve activation system. The process of matching the power density of the second power stroke to that of the first can be accomplished by varying the timing and duration of the opening and closing of either or both of the intake valve 136 and exhaust valve 146 as described herein. For example, at some engine operating points the intake valve 136 may not open during the second compression stroke and at some engine operating points the exhaust valve 146 may not open during the second compression stroke.

Figure 8:
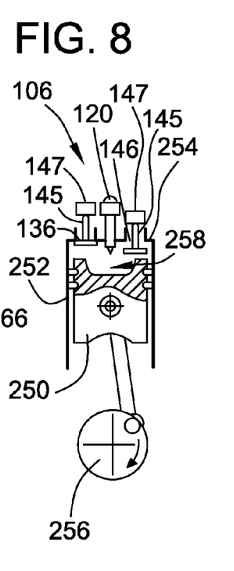

The second combustion event can further incinerate the unburned combustion products from the initial combustion event such as unburned fuel and soot. The quantity or amount of hydrocarbons in the resulting second combustion products 266 remaining in the cylinder 252 may also be reduced. Referring to FIG. 8, an exhaust stroke can be performed during which the momentum of the crankshaft 256 moves the piston 250 back to the TDC position with the exhaust valve 146 opened to discharge the second combustion products to the exhaust system. Alternatively, additional recompression and re-combustion strokes can be performed. With the exhaust valve opened as indicated by the bell-shaped exhaust curve 274 in FIG. 9, the pressure in the cylinder can return to its initial pressure as indicated by the low, flat exhaust curve 292 in FIG. 10.

An engine controller that monitors and controls operation of various engine components and systems such as intake and exhaust valve timing, fuel injector activation for injection duration and initiation and the like, may be used to control and optimize engine operation and emissions including, as desired, matching the power densities produced by the first and second power strokes of the six-stroke cycle. The controller may monitor various signals indicative of operation of the engine combustion system, for example, exhaust temperature, blowdown gas temperature, cylinder pressure, engine airflow, EGR gas flow, EGR valve position, exhaust pressure, intake pressure, intake air temperature, altitude and the like either directly by use of sensors, as previously discussed, or indirectly by calculating or otherwise estimating these parameters.

With such information, and relative to the present disclosure, the controller may dynamically balance, in real time, the fuel and charge gas mixture used for the first power stroke and the timing of the opening and closing of the intake and/or exhaust valves during the second compression stroke to vary the amount of the remaining combustion products in the combustion chamber for the second compression stroke and thereby substantially match the power densities of the first and second power strokes. The desired power density for the first and second power strokes can be determined and adjusted, on a real time basis, by the controller based on one or more operating parameters of the engine including, for example, the then-present engine speed and load at which the engine is operating.

INDUSTRIAL APPLICABILITY

The present disclosure is applicable to internal combustion engines performing a six-stroke combustion cycle. FIG. 11 illustrates a representative flowchart of one method 400 of operating an engine system 100. After starting at 401, the method includes opening the intake valves 136 during an intake stroke to introduce air into the combustion chamber 106 at 402. Once the piston 250 reaches the BDC position, the intake valves 136 close and the first compression stroke compresses the air in the combustion chamber 106 at 404. At some point during the first compression stroke, fuel can be introduced into the combustion chamber 106 to create an air/fuel mixture at 406. According to the present disclosure, the composition of the air/fuel mixture can be chosen to produce a desired power density for a first power stroke of the piston. At a time near the time when the piston 106 reaches the TDC position, the air/fuel mixture may combust at 408, expanding against the piston during the first power stroke and forcing the piston back to the BDC position. In a second compression or recompression stroke, the piston 250 can compress the combustion products 262 in the combustion chamber 106 at 410. During the second compression or recompression stroke, the intake valve 136 and/or the exhaust valve 146 can open at 411 and a portion of the combustion products 262 can be expelled from the combustion chamber as blowdown exhaust gasses at 412. According to the present disclosure, the timing and duration that the intake valve 136 and/or exhaust valve 146 are open, and thereby the amount of combustion products 262 expelled from the combustion chambers, can be determined so as to match the power density of a second power stroke of the piston with the power density of the first power stroke.

Once the piston 250 reaches the TDC position, additional fuel can be introduced into the combustion chamber 106 to mix with the remaining combustion products. The compressed air/fuel/combustion product mixture combusts at 414, forcing the piston 250 towards the BDC position during a second power stroke. After the second power stroke, second combustion products 266 remain in the combustion chamber. To clear the combustion chamber of these products, the engine system can perform an exhaust stroke at 416 during which the momentum of the crankshaft 256 moves the piston 250 back to the TDC position with the exhaust valve 146 opened to discharge the second combustion products 266 to the exhaust system.

Figure 12:
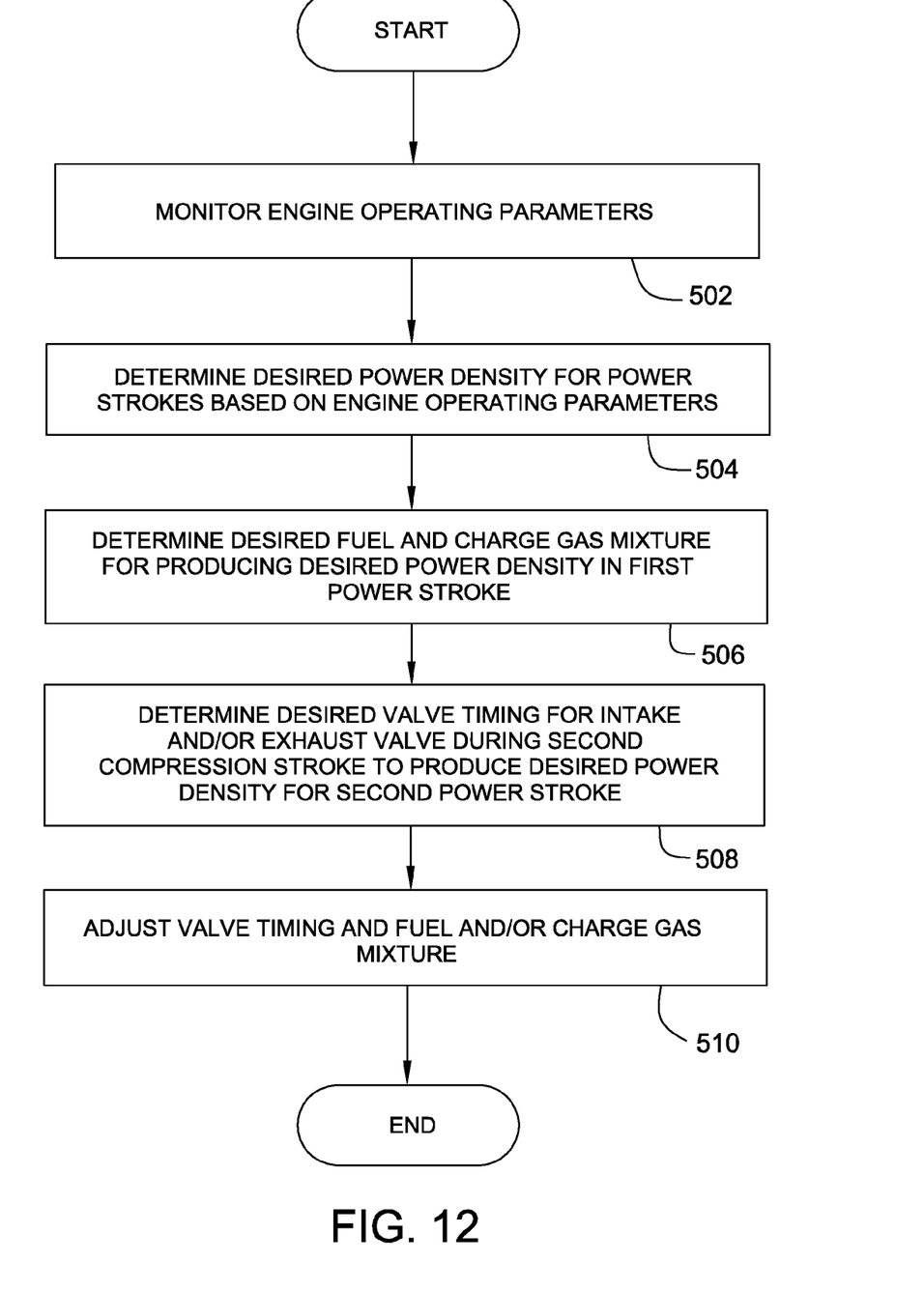
FIG. 12 is a flowchart for another method of operating a six-stroke combustion cycle engine in accordance with the disclosure.

Another flowchart for a method of controlling operation of an internal combustion engine operating a six-stroke cycle is provided in FIG. 12. In reference to the flowchart, one or more engine operating parameters are monitored at 502. This may include a reading in an electronic controller of parameters indicative of the then-present engine speed and load. The engine speed may be determined or inferred based on a sensor reading that indicates the rate of rotation of an engine crankshaft, camshaft, or other rotating engine component. Engine load may be determined directly, for example, by a strain sensor associated with an engine output shaft, or may alternatively be determined or inferred based on a fueling command provided to the fuel injectors of the engine, where the amount of engine fuel is indicative of engine torque or power output.

On the basis of the engine operating parameters, a desired power density for the first and second power strokes is determined in the controller at 504. Based on this determination, the desired fuel and charge gas mixture for producing the desired power density in the first power stroke is determined by the controller at 506. Additionally, based on the determination of the desired power density, the timing of the opening and closing of the intake and exhaust valves during, for example, the second compression stroke that will produce the desired power density during the second power stroke is determined in the controller at 508. Based on the various engine operating parameters monitored at 502, the controller may adjust the intake and/or exhaust valve timing and/or the fuel and charge gas mixture at 510. Adjustments may be made to address operating thresholds of cylinder operation. More particularly, the monitoring of engine parameters may indicate that, possibly due to environmental conditions, the operation of the combustion cylinders is approaching operational limits.

One possible benefit of attempting to equalize the power densities of the first and second power strokes is equalizing the power produced by the first and second power strokes. This can allow power to be applied more consistently to the crankshaft. Further, cylinder pressure cycles and vibrations resulting from the power strokes may be distributed more evenly. For example, in one embodiment, the vibrations between different chambers may in part cancel or dampen each other out across different combustion chambers in a multi-chamber engine. Thus, substantially equalizing the power densities between the two power strokes may smooth engine operation and reduce the risk of damage due to vibration.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An internal combustion engine system operating on a six-stroke cycle comprising:
   an internal combustion engine including a cylinder, a piston reciprocally disposed in the cylinder to move between a top dead center position and a bottom dead center position, an intake system communicating with the cylinder to introduce charge gas into the cylinder through an intake valve, an exhaust system communicating with the cylinder to direct exhaust gasses from the cylinder through an exhaust valve and a fuel injector disposed to inject fuel into the cylinder, wherein the engine operates on a combustion cycle that includes an intake stroke, during which air is admitted into the combustion cylinder, a compression stroke, during which the air in the combustion cylinder is compressed and fuel is added, a first power stroke, a second compression stroke, during which products from the first combustion stroke are compressed in the combustion cylinder, a second power stroke, and an exhaust stroke; and
   a controller being configured and operable to determine a desired power density for a power stroke of the piston in the cylinder based on one or more operating parameters of the internal combustion engine, control opening of the intake valve and operation of the fuel injector to provide a desired fuel and charge gas mixture for producing the desired power density during a first power stroke of the piston in the cylinder, and control timing of at least one of the intake and exhaust valves during the second compression stroke of the piston in the cylinder to produce the desired power density during the second power stroke.

2. The internal combustion engine of claim 1, wherein the one or more operating parameters comprises at least one of engine speed and engine load.

3. The internal combustion engine of claim 1, further comprising an exhaust gas recirculation (EGR) system that includes an EGR valve, the EGR valve being fluidly interconnected between the exhaust system and the intake system such that, when the EGR valve is open, a portion of products from the second combustion stroke that are provided to the exhaust system is provided, through the EGR valve, to the intake system of the internal combustion engine.

4. The internal combustion engine of claim 2, wherein the controller is further configured to control an opening of the EGR valve.

5. The internal combustion engine of claim 3, wherein the exhaust gas recirculation system is a high-pressure exhaust gas recirculation system.

6. The internal combustion engine of claim 3, wherein the at least one exhaust gas recirculation system is a low-pressure exhaust gas recirculation system.

7. The internal combustion engine of claim 1, further including a variable valve activation system for activating the intake valve and the exhaust valve.

8. An internal combustion engine having a combustion cylinder, which operates on a combustion cycle that includes an intake stroke, during which air is admitted into the combustion cylinder, a compression stroke, during which the air in the combustion cylinder is compressed and fuel is added, a first power stroke, a second compression stroke, during which products from the first combustion stroke are compressed in the combustion cylinder, a second power stroke, and an exhaust stroke, the engine comprising:
 an intake system in fluid communication with the combustion cylinder;
 an exhaust system in fluid communication with the combustion cylinder;
 an intake valve disposed to selectively fluidly connect the combustion cylinder with the intake system;
 an exhaust valve disposed to selectively fluidly connect the combustion cylinder with the exhaust system;
 a variable valve activation system configured to activate the intake valve and the exhaust valve;
 a fuel injector disposed to inject a fuel into the combustion cylinder; and
 a controller configured to determine a desired power density for a power stroke of the piston in the cylinder based on one or more operating parameters of the internal combustion engine and provide command signals to the variable valve activation system and the fuel injector such that a desired fuel and charge gas mixture is introduced into the combustion cylinder for producing the desired power density during the first power stroke and at least one of the intake valve and the exhaust valve are activated during the second compression stroke according to a timing that produces the desired power density during the second power stroke.

9. The internal combustion engine of claim 8, wherein the one or more operating parameters comprises at least one of engine speed and engine load.

10. The internal combustion engine of claim 8, further comprising an exhaust gas recirculation (EGR) system that includes an EGR valve, the EGR valve being fluidly interconnected between the exhaust system and the intake system such that, when the EGR valve is open, a portion of products from the second combustion stroke that are provided to the exhaust system is provided, through the EGR valve, to the intake system of the internal combustion engine.

11. The internal combustion engine of claim 10, wherein the controller is further configured to control an opening of the EGR valve.

12. The internal combustion engine of claim 10, wherein the exhaust gas recirculation system is a high-pressure exhaust gas recirculation system.

13. The internal combustion engine of claim 10, wherein the at least one exhaust gas recirculation system is a low-pressure exhaust gas recirculation system.

14. A method of operating an internal combustion engine having one or more combustion chambers operating a six-stroke cycle, the method comprising:
 monitoring one or more operating parameters related to the internal combustion engine;
 determining a desired power density for a power stroke of a piston in a combustion chamber of the internal combustion engine based on the one or more operating parameters;
 determining a desired fuel and charge gas mixture for producing the desired powered density for a first power stroke of the piston;
 introducing the desired fuel and charge gas mixture into the combustion chamber;
 combusting the fuel and charge gas mixture in the combustion chamber of the internal combustion engine in the first power stroke thereby producing first combustion products;
 compressing the first combustion products in the combustion chamber in a compression stroke;
 determining a desired valve timing for the compression stroke for an intake valve and an exhaust valve associated with the combustion chamber to produce the desired power density for a second power stroke of the piston; and
 activating at least one of the intake valve and the exhaust valve during the compression stroke according to the desired valve timing to release a portion of the first combustion products from the combustion chamber through one or both of the intake valve and the exhaust valve during the compression stroke.

15. The method of claim 14, wherein the valve timing of the intake valve is consistent with a Miller thermodynamic combustion cycle.

16. The method of claim 14, wherein the one or more operating parameters comprises at least one of engine speed and engine load.

17. The method of claim 14, further comprising recirculating a portion of the products of the second combustion stroke from the exhaust system into the intake system through an exhaust gas recirculation (EGR) system that includes an EGR valve, the EGR valve being fluidly interconnected between the exhaust system and the intake system such that, when the EGR valve is open, the portion of the products from the second combustion stroke that are provided to the exhaust system is provided, through the EGR valve, to the intake system of the internal combustion engine.

18. The method of claim 17, further comprising controlling the EGR valve simultaneously with fluidly connecting the combustion cylinder with the intake system to inject products from the first combustion stroke into the intake system by using an engine operating point as a primary control parameter.

19. The method of claim 17, wherein the exhaust gas recirculation system is a high-pressure exhaust gas recirculation system.

20. The method of claim 17, wherein the at least one exhaust gas recirculation system is a low-pressure exhaust gas recirculation system.

* * * * *